United States Patent [19]
Bawa et al.

[11] Patent Number: 4,549,037
[45] Date of Patent: Oct. 22, 1985

[54] ENVIRONMENTALLY SEALED CABLE CONNECTOR

[75] Inventors: Jaspal S. Bawa, Neshanic Station; Luis R. Couto, Hillside; Edward S. Rapacki, Carteret; Alfred Wood, Cranford, all of N.J.; Walter A. Pobuta, deceased, late of Elizabeth, N.J., by Grace Pobuta, executrix

[73] Assignee: Thomas & Betts Corporation, Raritan, N.J.

[21] Appl. No.: 432,055

[22] Filed: Sep. 30, 1982

[51] Int. Cl.⁴ ............................................. H02G 3/06
[52] U.S. Cl. ................................................ 174/65 SS
[58] Field of Search ............. 174/65 SS, 76; 249/105; 285/158-162

[56] References Cited

U.S. PATENT DOCUMENTS

| 1,805,155 | 5/1931 | Weeks | 174/65 SS X |
| 3,617,614 | 11/1971 | Henry | 174/77 R |
| 3,761,601 | 9/1973 | Kaesser et al. | 174/52 R |

FOREIGN PATENT DOCUMENTS

| 621092 | 5/1961 | Canada | 174/65 SS |
| 0039862 | 11/1981 | European Pat. Off. | 174/65 SS |
| 1524684 | 9/1978 | United Kingdom. | |

Primary Examiner—A. T. Grimley
Assistant Examiner—D. A. Tone
Attorney, Agent, or Firm—Robert M. Rodrick; Salvatore J. Abbruzzese

[57] ABSTRACT

A cable connector for metal clad cable including a body portion having a cable receiving opening therethrough. A hollow grounding member extends through the body and attaches to the metal jacket of the cable. The hollow member includes an opening for receiving a conductor surrounding material therein which seals the cable from adverse environmental conditions. Channel means on the hollow member insures passage of the conductor surrounding material therethrough.

22 Claims, 4 Drawing Figures

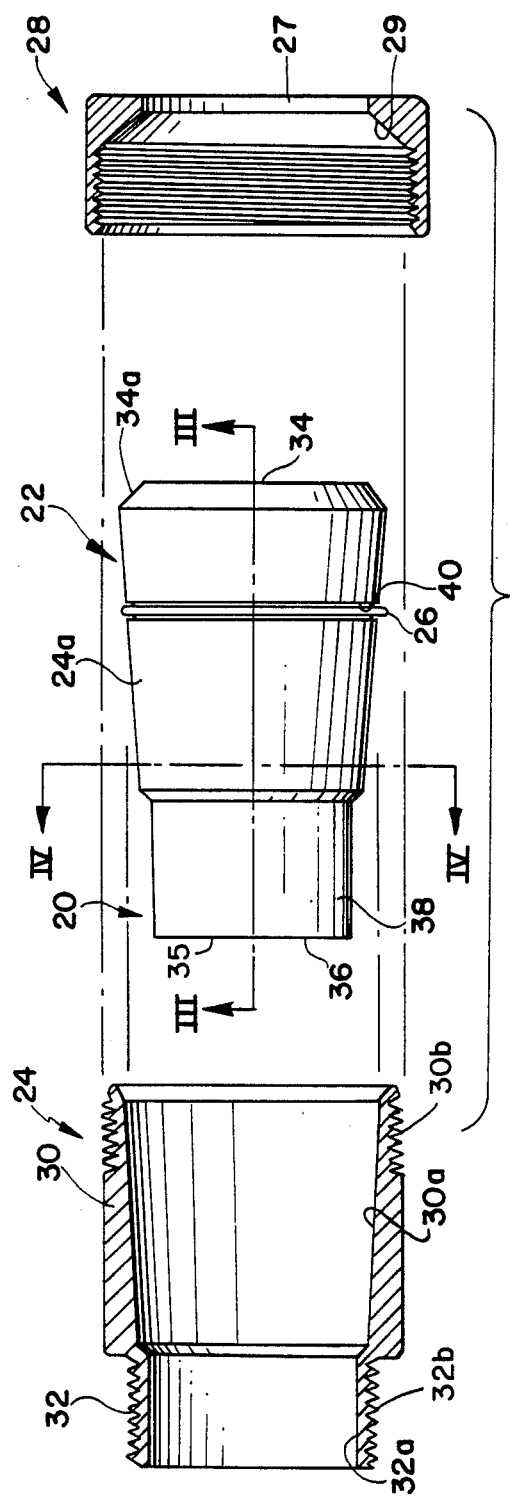
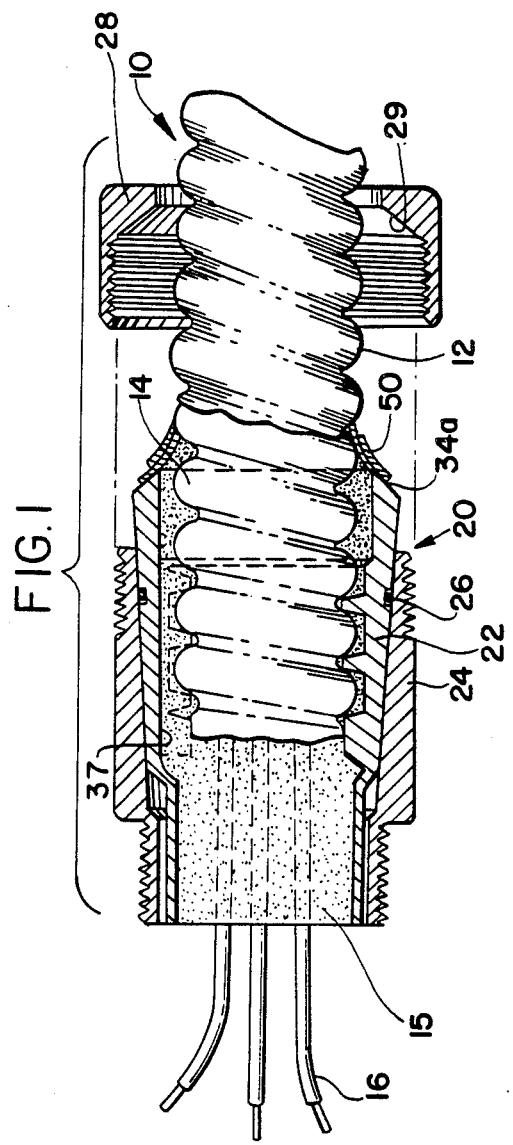

4,549,037

ENVIRONMENTALLY SEALED CABLE CONNECTOR

FIELD OF THE INVENTION

This invention relates to method and apparatus for terminating electrical cable and more particularly to connectors suitable for terminating jacketed cable in such a manner as to seal the cable from environmental hazards.

BACKGROUND OF THE INVENTION

Cables of the metal-clad type typically comprise an outer metallic armor or sheath which may be insulated and a plurality of internal conductors or wires, some of which may be individually insulated. Such metal clad cables are used, for example, for conducting power and/or control signals to distribution centers, motors, panel boards and numerous other electrical and electro-mechanical apparatus.

The environments in which such cables may be used may vary substantially. That is, cables are often connected to another cable or an electrical apparatus in moist conditions, sometimes even in standing water, in sandy or extremely dusty conditions, in conditions where there may be surrounding potentially explosive gases and numerous other surrounding environmental influences. Such other influences include vibrations and cable strains introduced by mechanical actions such as by pushes and pulls. A cable connector used to connect the cable to another cable or an electrical apparatus therefor is also subjected to similar environmental conditions. Cable connectors that do not properly seal the cable in certain potentially hazardous conditions permit an additional potential hazard to exist. For example, such leakage can introduce adverse conditions to the sensitive components of engines, switches, controls and the like. Moreover, apparatus which is potentially hazardous itself, such as in the case of motors capable of exploding when they fail, should be completely shielded at the wall of the apparatus so as to prevent personnel injuries and injury to other apparatus in the event of such an explosion.

Various electrical codes such as the National Electrical Code (NEC) require connectors used in these situations to be "explosion proof", i.e., the connector must be capable of withstanding explosion within a box or enclosure to which it is connected, preventing ignition thereby of surrounding gases and thus preventing transmission of gases through the cable core.

Therefore, it may be seen that such cable connectors are desirably made to insure a tight fit around the cable to reduce the effects of cable strain, provide a grounded connection to the metal armor and seal the cable from the above-mentioned environmental hazards.

Explosion-proof connectors in present use generally include multiple components, and often from six to ten parts, including various gland nuts, bushings, pressure rings, sleeves, lock nuts, gaskets and the like. As can be readily appreciated, these various structures must include fittings wherein the parts must precisely fit together to perform their intended functions. The loss of any part, which parts are usually non-standard by nature, means that the entire connector may no longer be useful. Furthermore, a connector made of many parts that fit together in a specific order is not only time-consuming and sometimes difficult to assemble, but is often susceptible to being constructed in the wrong order, in which event the entire connector becomes ineffective. As the seals are not successfully assured, grounding connections are not effectively made, and the like.

Beyond the above-known connectors, the cable terminating art has seen improvement in explosion-proof connectors. In a commonly assigned, copending application, Ser. No. 06/369,112 filed Apr. 16, 1982, a cable connector is disclosed which provides an environmentally sealed connector with relatively few parts and which overcomes many of the problems of the prior connectors. Such a connector comprises a body, grounding sleeve for connection with the metal jacket and an extension of the grounding sleeve which receives a sealing compound therein. This compound, which is poured in the opening of the extension, surrounds the internal conductors, and when set, provides an environmental seal for the cable. A compression gland, which is secured by a gland nut to the body, encloses the jacketed end of the cable and provides a complete seal therearound.

While the above-mentioned connector provides the desired "explosion proof" seal, it is desirous to insure that the sealing compound poured through the extension flows through to the grounding sleeve to seal the cable by fully surrounding the armor and the outer jacket.

SUMMARY OF THE INVENTION

It is, therefore, an object of the present invention to provide an improved cable connector.

It is a more particular object to provide an environmentally sealed connector for use in hazardous environments.

In the efficient attainment of the foregoing and other objects, the invention looks toward providing a cable connector having a body portion having an opening therethrough for receiving the cable. A hollow member which may provide grounding connection to the body extends therethrough. The hollow member includes an opening for receiving a conductor surrounding material therein which fills the sleeve and seals the cable from adverse environmental conditions. Channel means on the hollow member insures passage of the conductor surrounding material therethrough to fully seal the cable.

BRIEF DESCRIPTION OF THE DRAWINGS

FIG. 1 shows partly in section a side elevation view of the connector assembly of the present invention, including therein a metal clad cable and a gland nut shown in non-engaged disposition.

FIG. 2 shows, in exploded view and partly in section, the components of the connector assembly of FIG. 1.

DETAILED DESCRIPTION OF THE PREFERRED EMBODIMENT

Figure 3:
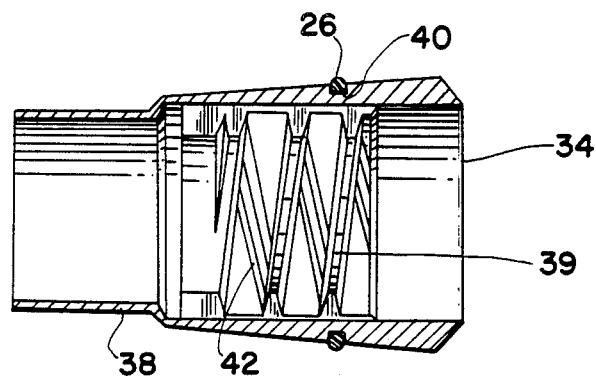
FIG. 3 shows in longitudinal section taken along the lines III—III of FIG. 2, one embodiment of the connector sleeve of the present invention.

Referring now to FIG. 1, there is shown a cable 10 and a connector assembly 20 in terminated condition. In preferred form, a metal clad cable 10 is shown, however, the present invention is not limited to use on such a cable, as it is contemplated that the connector 20 may be employed with cable other than that having a metal jacket. In the present embodiment, metal clad cable 10 includes an insulative jacket 12 surrounding a scroll-type metallic sheath 14, and a plurality of conductor cables 16, which may or may not be individually insulated, extending therethrough. Wadding or other type filling material (not shown) may be interposed between the conductors to fill the void therebetween, and as will be described hereinafter for retaining conductor surrounding material 15 poured therein. As shown in FIG. 1 for termination in connector assembly 20, cable 10 is prepared having a portion of the jacket 12 and sheath 14 cut away to expose an extending length of conductors 16. The jacket 12 is further stripped away, leaving an exposed axial portion of metallic sheath 14. If cable 12 does not already include the above-mentioned wadding between the conductors, such material is placed therein below the line at which the metallic sheath 14 is cut away. As will be described in more detailed hereinafter, cable 10 is inserted into a metallic grounding sleeve 22 which in turn is seated in a body 24. An O-ring 26 provides a moisture seal between the grounding sleeve 22 and body 24. A gland nut 28 shown in nonengaged position, compresses the entire assembly together completing the termination.

Shown in FIG. 2 is connector assembly 20 which includes connector body 24, sleeve 22, O-ring 26 and gland nut 28. Typically body 24, sleeve 22 and gland nut 28 are made of a suitable metal such as aluminum, while O-ring 26 is typically made of a compressible elastomer.

Connector body 24 is an elongate, hollow, generally cylindrical member, having an enlarged cable receiving portion 30 and a smaller conductor egressing portion 32. Cable receiving portion 30 has a conically tapered bore 30a, which tapers toward conductor egressing portion 32. A cylindrical bore 32a in communication with bore 30a extends through conductor egressing portion 32. Bores 30a and 32a are dimensioned so as to receive sleeve 22 therein as will be described hereinafter. The external surface of conductor egressing portion 32 is screw threaded at 32b so as to be screw cooperative with another electrical apparatus for connection thereto. The wider cable receiving portion 30 is also externally threaded as at 30b so as to cooperate with the internal threads of gland nut 28, as will be described hereinafter.

Sleeve 22, which accepts cable 10, is also an elongate, generally tubular member, being slightly longer than body 24. Sleeve 22 has a cable receiving opening 34 which when in assembled position is adjacent cable receiving portion 30 of body 24, a conductor egressing opening 35 adjacent egressing portion 36 of body 24 and a central passage 37 therebetween. Sleeve 22 is internally threaded at 39 (as shown in FIG. 3) adjacent cable receiving opening 34 for matingly accommodating the scroll-type external surface of the metallic cable sheath 14. The external surface 24a of sleeve 22, along an extent adjacent cable receiving opening 34, is conically tapered toward egressing opening 36 with respect to its central axis. The above-mentioned conical bore 30a of body 24 is dimensioned so as to accommodate therein the conically tapered sleeve 22 with very close interfering tolerance. The desired dimensions are such that when seated in bore 30a, sleeve 22 will be force-fitted therein. As the length of sleeve 22 is in excess of body 24, the taper of sleeve 22 will contact the taper of bore 30a to positively seat sleeve 22 therein. As shown in FIG. 1, when properly seated, an extent of sleeve 22 adjacent receiving opening 34 will extend beyond the end of receiving portion 30 of body 24.

Sleeve 22 also includes, preferably integral therewith, a cylindrical extension 38 extending from the edge of conical surface 24a to egressing opening 36. Extension 38 is typically cylindrical and has a central bore which forms part of central passage 37 through which extending conductors 16 of cable 10 pass. The outside dimension of extension 38 is such that it fits within the bore 32a and extends coaxially with the egressing end 32 of body 24. In the presently described embodiment, extension 38 extends approximately as far as the end of egressing end 32 of body 24 as shown in FIG. 1, however, extension 28 may be designed to extend beyond egressing end 32, if so desired.

Sleeve 22 includes on its external surface 24a, inwardly of receiving opening 34, an annular groove 40 which extends therearound and seats therein the O-ring 26. In preferred form, the cross-sectional shape of annular groove 40 is trapezoidal, having a narrow outer portion, so that O-ring 26 will be securely retained within groove 40. Compressible O-ring 26 forms a seal between seated sleeve 22 and body 24 when connected as shown in FIG. 1. This seal prevents moisture from passing between sleeve 22 and body 24 and entering the connector assembly 20.

The end of sleeve 22 extending beyond cable receiving end 30 of body 24 includes a chamfered end 34a adjacent receiving opening 34. Chamfered end 34a forms a frustro-conical surface for mating with a similarly formed surface on gland nut 28 as will be described hereinafter.

Figure 4:
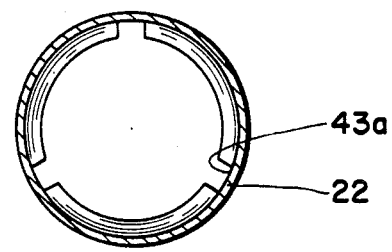
FIG. 4 shows in transverse section, taken along the lines IV—IV of FIG. 2, another embodiment of the connector sleeve of the present invention.

Referring now to FIGS. 3 and 4, two alternative embodiments of sleeve 22 are shown. In each embodiment, means is provided for allowing full passage of the conductor surrounding material 15 therethrough. As indicated hereinbelow, this material which is in fluid form, is poured into sleeve 22 and flows down to fill and surround cable 10.

In FIG. 3 one alternative of such passage means is shown as a spiral groove 42 which helically traverses a central extent of the inner surface of sleeve 22. Spiral groove 42 extends in a direction opposite that of the internal screw thread 39 of sleeve 22, so that the groove 42 will remain open upon insertion of cable 10. Groove 42 traces a helical path between extension 38 and a point inward of the chamfered end 34a of sleeve 22 and terminating with the termination of internal thread 39.

It can be readily appreciated that any shaped groove of any suitable width may be employed to open a flowing passage through the sleeve 22, the spiral groove of FIG. 3 being shown by way of example. One other example of such a groove is shown in FIG. 4 where the flowing passage is formed by a plurality (in this case, three) of elongate circumferentially spaced apart longitudinal grooves 43a. Each groove 43a is cut from the inner wall of sleeve 22 and extends along a central longitudinal extent thereof. As with the spiral groove described above, longitudinal grooves 43a extend from the edge of extension 38 to a point inward of chamfered end 34a.

Referring again to FIG. 2, the final component of connector assembly, gland nut 28 is shown. Gland nut 28 includes a screw-threaded inner surface 28a which cooperates with the external threads 30b of receiving portion 30 of body 24. The gland nut also includes a central opening 27 for slidable engagement over cable 10. A frusto-conical inner surface 29, circumjacent opening 27 which mates directly with chamfered surface 34a of sleeve 22, as above mentioned, urges sleeve 22 into intimate contact with body 24 when assembled. The direct metal to metal contact of gland nut 28 and sleeve 22, while not only urging sleeve 22 into body 24, also provides non-movable securement thereto. Such metal-to-metal engagement minimizes, if not eliminates, the likelihood of gases entering the connector and thereby prohibits explosive gases from passing through the connector.

Having described in detail cable 10 and connector assembly 20, the operation of the connector may now be described with reference to the drawings.

Cable 10, as shown in FIG. 1 and described above, is screwed into the internally screw-threaded sleeve 22, using scroll-type metal jacket 14. This screw-threaded rotation provides good electrical contact between metal jacket 14 and sleeve 22 for grounding purposes. The sleeve 22 is then inserted in body portion 24. The tapered outer surface of sleeve 22 is forced into contact with the tapered inner surface of body 24. This wedge-type contact provides good electrical connection between sleeve 22 and body 24. It can be appreciated that in this position, an electrical connection will be maintained between the metal jacket 14 and the connector assembly 20. This electrical connection is normally a ground connection for the cable 10 connector assembly 20.

A moisture seal is provided by O-ring 26, which is seated in annular groove 40 on sleeve 22, and is compressed between the outer surface of sleeve 22 and inner surface of body 24. Gland nut 28, shown in FIG. 1 around cable 10 is disassembled position, and which is placed on the cable 10 prior to insertion into sleeve 22, is screw-cooperative with the cable receiving end 30 of body 24. The tapered inner surface 29 of gland nut 28 matingly engages the chamfered surface 34a of the protruding portion of sleeve 22. This mating surface cooperation urges sleeve 22 into tight engagement in body 24 upon attachment of gland nut 28 to body 24, further assuring good electrical contact therebetween.

Having attached the cable to the connector as above described, the connection is then rendered "explosion-proof" by surrounding the conductors 16 in cable 10 with a sealing compound 15. This compound which is initially in fluid form, hardens upon suitable curing to seal the end of the cable and prevent hazardous gases from passing therethrough.

Cable 10 and connector assembly 20 is supported in a vertical position with conductors 16 extending upwardly through connector assembly 20. To retain the fluid material therein, the end of sleeve 24, adjacent chamfered surface 34a, is dammed, for example, with electrical tape 50 being wrapped around the cable and up over chamfered surface 34a. Additionally, if cable 10 does not include a wadding material between conductors, such material which may be, for example, cotton, may be placed therein and packed toward the bottom of the connector assembly 20 to further retain the fluid material.

An ideal compound for use in the connector assembly is one which is flame retardant and which will withstand exposure to hazardous gases. Such a material should preferably have a semi-viscous initial consistancy, and be capable of being poured. In such a state the material may be poured into sleeve 22 through extension 38. The material flows into the cable and between the conductors 16, being retained by the wadding packed therein. Material also flows between sleeve 22 and the metallic jacket 14. Groove 42 (for example) on the inside wall of the sleeve 22 allows the fluid material to flow completely around the outside of metal jacket 14. The material on the outside of jacket 14 is retained by the tape 50 placed therearound. The poured material is allowed to completely surround the conductors and the metal jacket and fills the sleeve up through extension 38.

Once pouring is completed, the material is allowed to set or cure and then will become solid. After the material has cured, the tape 50 is removed and the connection examined. When properly filled, the material would have flowed through the bottom of sleeve 22 and surrounded cable 10 and be visible below chamfered surface 34a.

It is contemplated that connector 20 need not be fully assembled as above described in order to pour the compound 15. Once sleeve 22 is attached to cable 10, and tape 50 wrapped therearound, the compound 15 may be poured therein. After allowing for curing, the sleeve and cable may then be inserted into body for connection thereto. In this manner the body 24 may be separately attached to an electrical apparatus with the cable and sleeve being connected to the body 24 thereafter.

Gland nut 28 is then threadably placed on the body 24 insuring a tight connection. The connector assembly is then ready for use.

Various other modifications to the foregoing disclosed connector will be evident to those skilled in the art. Thus, the particularly described preferred embodiment is intended to be illustrative and not limited thereto. The true scope of the invention is set forth in the following claims.

What is claimed is:

1. A cable connector for use on an electrical cable having a plurality of conductors extending therethrough, the connector comprising:
   a body having a cable receiving end, a conductor egressing end and a central cavity extending therethrough;
   a hollow member extending within said central cavity having an opening adjacent said conductor egressing end for receiving conductor surrounding material therein, said hollow member including means for securement to said electrical cable;
   channel means on said hollow member, separate from said securement means for passage of said conductor surrounding material through said hollow member; and
   means for effecting a seal between said cable and said body.

2. The connector of claim 1 wherein said hollow member is an elongate tubular member having an inside wall and said channel means includes a groove extending within said inside wall.

3. The connector of claim 2 wherein said groove is spirally formed along a longitudinal extent of said tubular member.

4. The connector of claim 2 wherein said groove is an elongate slot formed along a longitudinal extent of said inside wall.

5. The connector of claim 1 wherein said hollow member projects externally beyond said conductor egressing end of said body.

6. The connector of claim 1 wherein said securement means includes a threaded portion of said hollow member for attachably securing said hollow member to said electrical cable.

7. A cable connector for connection with an electrical cable having an outer metallic sheath and a plurality of conductors therein, said connector comprising:
   a body having a cable receiving end, a conductor egressing end and a central opening therethrough;
   a conductive member having engagement means for securement to said outer metallic sheath, said conductive member being supported in said body opening in contact therewith;
   a hollow member extending within said body opening adjacent said egressing end, said hollow member having an aperture therethrough for passage of said cable conductor, said hollow member defining a chamber for receipt of a conductor surrounding material therein;
   channel means separate from said engagement means for passage of said conductor surrounding material through said conductive member; and
   means for effecting a seal between said cable and said body.

8. The connector of claim 7 wherein said conductive member includes a central opening for passage of said conductor therethrough, said central opening being in communication with said hollow member chamber.

9. The connector of claim 8 wherein said conductive member and said hollow member are integral.

10. The connector of claim 9 wherein said central body opening is tapered adjacent said cable receiving end, said conductive member is externally tapered and said tapered central opening receives said tapered conductive member with a close interfering tolerence.

11. The connector of claim 13 wherein said conductive member includes a frustro-conically chamfered outer edge opposite said hollow member.

12. The connector of claim 11 further including a gland nut for attachment to said receiving end of said body, said gland nut having a frusto-conically chamfered edge, engageable with the chamfered edge of said conductive member, said gland nut adapted to urge said conductive member into contact with said body upon attachment thereto.

13. The connector of claim 9 wherein said sealing means includes a sealing member disposed between said conductive member and said body.

14. The connector of claim 8 wherein said conductive member and hollow member are generally tubular, having an inside wall and said channel means includes a groove on said inside wall.

15. The connector of claim 14 wherein said groove is an elongate slot formed along a longitudinal extent of said inside wall.

16. The connector of claim 14 wherein said groove is spirally formed along a longitudinal extent of said inside wall.

17. The connector in accordance with claims 7 or 9 wherein said hollow member projects externally beyond said conductor egressing end of said body.

18. The connector of claim 7 wherein said engagement means includes a threaded portion of said conductive member for screw engagement with the outer metallic sheath of said electrical cable.

19. In a connector for cable having at least one conductor extending therethrough said connector including a body having a cable receiving end, a conductor egressing end and a central cavity therethrough, apparatus for environmentally sealing said cable comprising:
   cable receiving means for extending within said central cavity, said cable receiving means having a first opening for receiving said cable, a second opening for allowing egress of said conductors and threaded means for securing said cable receiving means to said cable; and
   channel means on said cable receiving means separate from said threaded means for passage of a conductor surrounding material therethrough.

20. The connector of claim 19 wherein said cable receiving means is an elongate tubular member having an inside wall and said channel means includes a groove on said inside wall.

21. The connector of claim 20 wherein said groove is spirally formed along a longitudinal extent of said tubular member.

22. The connector of claim 20 wherein said groove is an elongate slot formed along a longitudinal extent of said tubular member.

* * * * *